(12) United States Patent
Makita

(10) Patent No.: US 6,269,186 B1
(45) Date of Patent: *Jul. 31, 2001

(54) IMAGE PROCESSING APPARATUS AND METHOD

(75) Inventor: Takeshi Makita, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,143

(22) Filed: Dec. 18, 1997

(30) Foreign Application Priority Data

Dec. 20, 1996 (JP) ................................ 8-341360

(51) Int. Cl.$^7$ ........................................ G06K 9/00
(52) U.S. Cl. .................. 382/172; 382/176; 382/270; 358/462; 358/466
(58) Field of Search ............................. 382/251, 176, 382/171, 172–173, 270, 271–272, 181, 190, 145; 358/462, 455–456, 466

(56) References Cited

U.S. PATENT DOCUMENTS

| | | | |
|---|---|---|---|
| 4,832,447 | * 5/1989 | Javidi | 359/561 |
| 5,150,433 | * 9/1992 | Daly | 382/250 |
| 5,337,373 | * 8/1994 | Marandici et al. | 382/145 |
| 5,386,508 | * 1/1995 | Itonori et al. | 717/1 |
| 5,649,024 | * 7/1997 | Goldsmith | 382/170 |
| 5,701,367 | * 12/1997 | Koshi et al. | 382/239 |
| 5,841,551 | * 11/1998 | Nakatani et al. | 358/426 |
| 5,867,593 | * 2/1999 | Fukuda et al. | 382/176 |
| 5,872,864 | * 2/1999 | Imade et al. | 382/176 |
| 5,920,655 | * 7/1999 | Makita et al. | 382/272 |

OTHER PUBLICATIONS

"An Automatic Threshold Selection Method Based On Discriminant and Least Squares Criteria", by Nobuyuki Otsu, Journal of Papers of The Institute of Electronics, Information and Communication Engineers vol. J63–D, No. 4, pp. 349–356, 1980. (English abstract).

* cited by examiner

Primary Examiner—Leo Boudreau
Assistant Examiner—Ishrat Sherali
(74) Attorney, Agent, or Firm—Fitzpatrick, Cella, Harper & Scinto (57) ABSTRACT

This invention relates to an image processing method of quantizing a multivalued image to perform image processing. The luminance frequency of the multivalued image is calculated, a quantization threshold for quantization is specified on the basis of the calculated luminance frequency, a representative value used for quantization of the multivalued image is calculated on the basis of the specified quantization threshold and the luminance frequency, and the multivalued image is quantized using the calculated representative value. The quantization threshold is an average luminance value obtained when the histogram distribution converges to make the skew of the histogram distribution of the luminance frequency fall within a predetermined range. The representative value is an average luminance value in each distribution region of the histogram distribution of the luminance frequency that is divided by the quantization threshold.

11 Claims, 11 Drawing Sheets

|  | START | END | AV | SK |
|---|---|---|---|---|
| FIRST PROCESSING | 0 | 255 | 177 | −78.9 |
| SECOND PROCESSING | 0 | 177 | 91 | −8.6 |
| THIRD PROCESSING | 0 | 91 | 43 | 9.6 |
| FOURTH PROCESSING | 43 | 91 | 72 | −7.0 |
| FIFTH PROCESSING | 43 | 72 | 58 | −2.2 |
| SIXTH PROCESSING | 43 | 58 | 50 | −0.4 |

IMAGE PROCESSING APPARATUS AND METHOD

BACKGROUND OF THE INVENTION

1. Field of the Invention

The present invention relates to an image processing apparatus and method for determining, e.g., the quantization threshold of a multivalued image to perform quantization.

2. Description of the Related Art

The recent development of image processing techniques is remarkable, and image processing apparatuses capable of processing of a multivalued image such as a full-color image, and character recognition processing in the multivalued image are becoming popular. In these image processing techniques, binarization processing of a multivalued image is an indispensable technique.

In addition to a simple binarization method using a fixed threshold set in advance, conventional binarization methods include the Otsu's method (Otsu, "Automatic Threshold Selection Method Based on Discrimination and Least Square Rule", the transactions of the Institute of Electronics and Communication Engineers of Japan, Vol. J63-D, No. 4, pp. 349–356, 1980) in which, when the histogram is divided into two classes at a certain threshold, a threshold obtained when the variance between the classes is maximized is used as a binarization threshold, and a binarization method of setting the threshold for an image having a gradation in accordance with the local density.

In the binarization methods in the conventional image processing apparatus, however, the following problems arise.

More specifically, in the simple binarization method using the fixed threshold, a proper threshold is difficult to set between the object density and background density within an image. As a result, the entire image becomes excessively dark or bright. In the Otsu's method, when the distributions of two classes are greatly different from each other, the threshold shifts to a larger class, and a binary image with many noise components is undesirably generated. In the binarization method of setting the threshold in accordance with the local density, a block skew easily occurs because the image is divided into local regions. Even if an optimal threshold can be specified, gray scale information such as the background and characters of an original image is lost by binarization.

SUMMARY OF THE INVENTION

The present invention has been made to solve the above problems, and has as its object to provide an image processing apparatus and method for setting a proper quantization threshold between the object density and background density within an input image to perform image processing.

In order to solve the above problems, it is another object of the present invention to provide an image processing apparatus and method capable of specifying an optimal quantization threshold to perform region separation without losing gray scale information such as the background and characters of an original image.

To achieve the above objects, according to the present invention, there is provided an image processing apparatus for quantizing a multivalued image to perform image processing, comprising first calculation means for calculating a luminance frequency of the multivalued image, specifying means for specifying a quantization threshold for quantization on the basis of the calculated luminance frequency, second calculation means for calculating a representative value used for quantization of the multivalued image on the basis of the specified quantization threshold and the luminance frequency, and quantization means for quantizing the multivalued image using the calculated representative value.

To achieve the above objects, according to the present invention, there is provided an image processing method of quantizing a multivalued image to perform image processing, comprising the steps of calculating a luminance frequency of the multivalued image, specifying a quantization threshold for quantization on the basis of the calculated luminance frequency, calculating a representative value used for quantization of the multivalued image on the basis of the specified quantization threshold and the luminance frequency, and quantizing the multivalued image using the calculated representative value.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of the present invention will be described in detail below with reference to the accompanying drawings.

Figure 1:
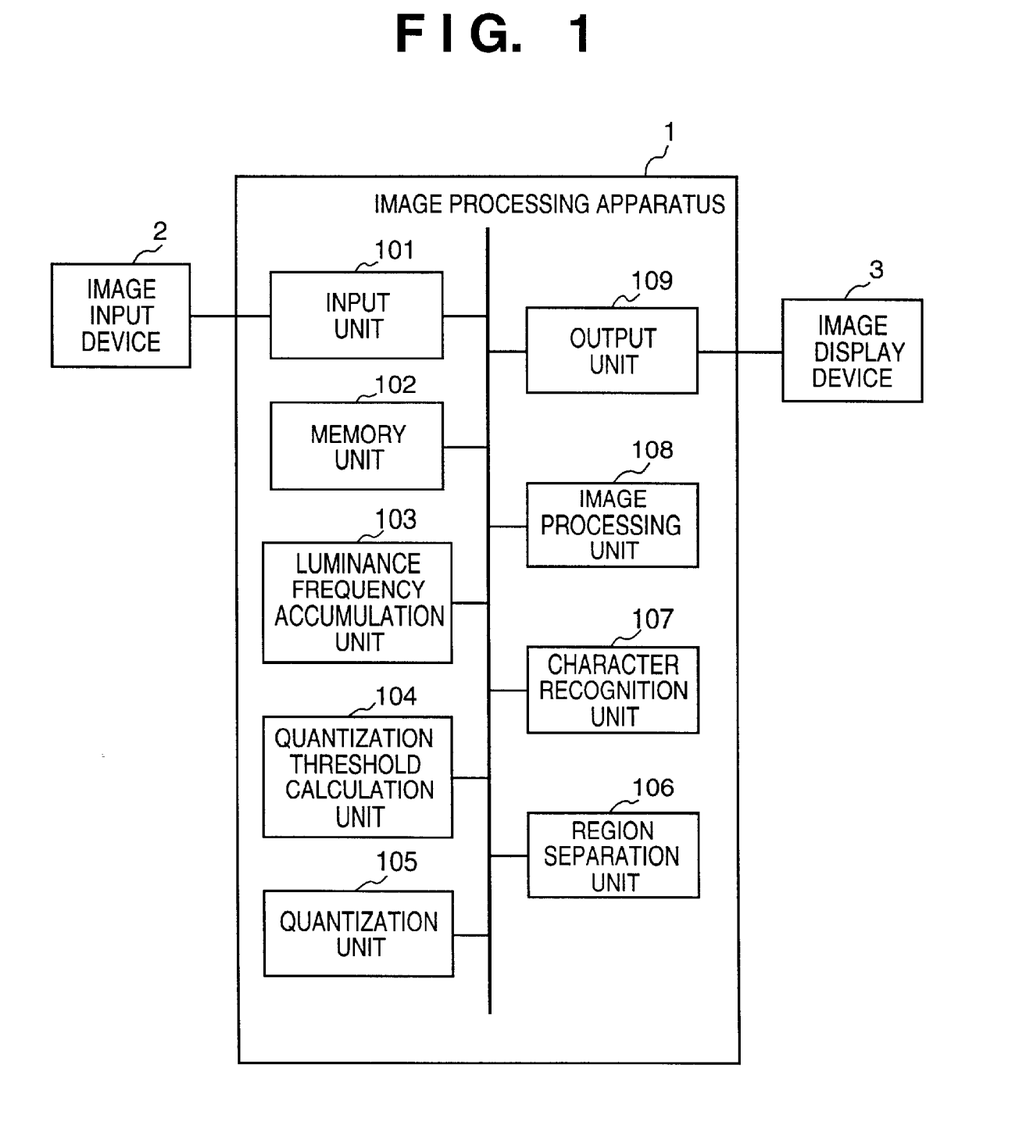
FIG. 1 is a block diagram showing the configuration of an image processing system according to an embodiment of the present invention.

FIG. 1 is a block diagram showing the configuration of an image processing system for executing quantization processing according to an embodiment of the present invention. In FIG. 1, reference numeral 1 denotes an image processing apparatus for performing character recognition processing; 2, an image input device such as a scanner for inputting an image; and 3, an image display device for displaying a processed image.

In the image processing apparatus 1, reference numeral 101 denotes an input unit serving as an interface with the image input device 2; 102, a memory unit such as a memory for storing data being processed; 103, a luminance frequency accumulation unit for accumulating the luminance frequency (histogram) of an input image; 104, a quantization threshold calculation unit for calculating the quantization threshold of the input image; and 105, a quantization unit for forming a quantized image using the threshold calculated in the quantization threshold calculation unit 104.

Reference numeral 106 denotes a region separation unit for dividing an image into regions for respective attributes; 107, a character recognition unit for performing character recognition processing for a region extracted as a character region by the region separation; 108, an image processing unit for performing various image processes for separated regions other than the character region; and 109, an output unit serving as an interface with the image display device 3. These constituent elements are integrally controlled by a control unit (not shown) constituted by a CPU for controlling the whole apparatus 1, a ROM storing programs and the like for the CPU, a RAM in which a work area, a table, and the like used by the CPU in executing processing are defined, and the like.

OCR processing executed in the image processing apparatus having the above arrangement according to this embodiment will be described below.

Figure 2:
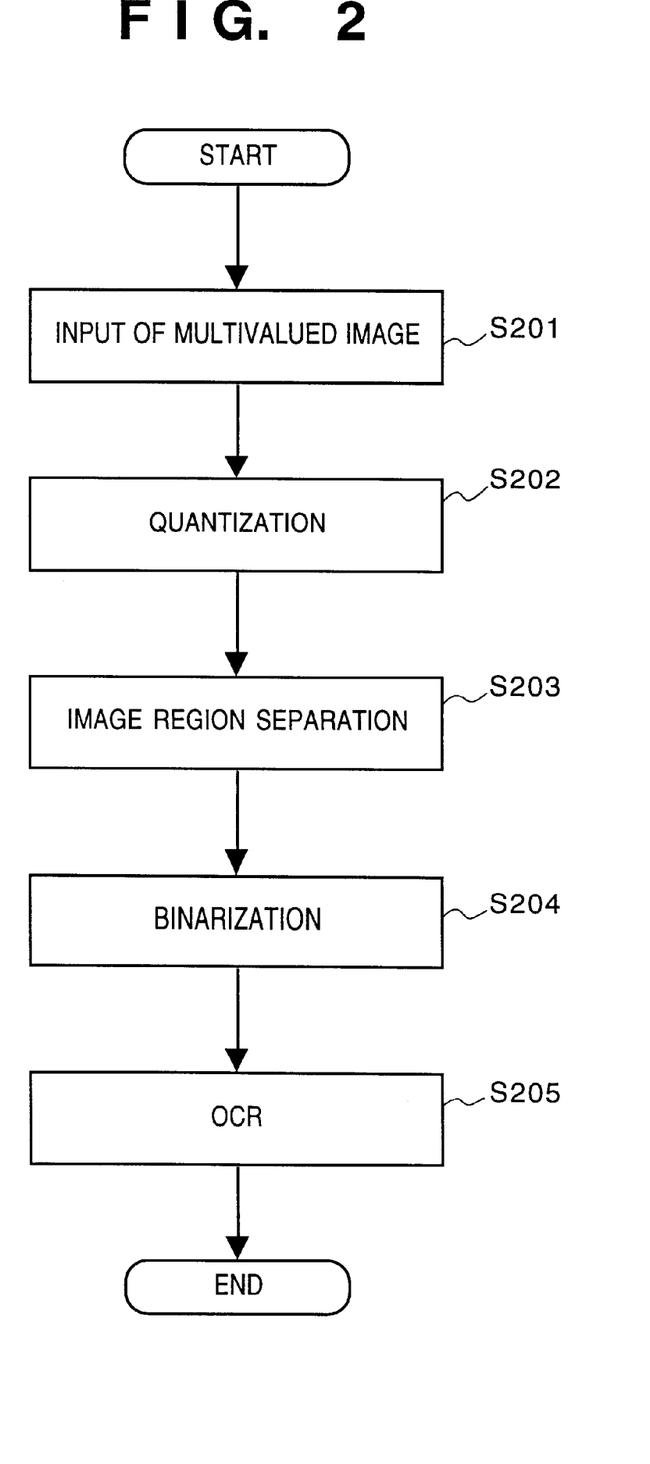
FIG. 2 is a flow chart showing image region separation OCR processing in this embodiment.

FIG. 2 is a flow chart showing image region separation OCR processing employing a quantization threshold determination method according to this embodiment.

In step S201, image data is input by the input unit 101 via the image input device 2 such as a scanner, and stored in the memory unit 102. The image data is input as 8-bit multivalued image data. In step S202, the quantization threshold calculation unit 104 determines a quantization threshold optimal for image region separation (to be described below) for the multivalued image input in step S201, and the quantization unit 105 generates a quantized image using the quantization threshold. In step S203, the region separation unit 106 performs image region separation for the quantized image generated in step S202, and outputs region data added with the attribute of the image to the image processing unit 108. In step S204, the image processing unit 108 binarizes a region designated as "text" in the region data separated in step S203, and extracts the binarized region from the binary image. The character recognition unit 107 performs OCR processing for the binary image, and outputs a recognized character code.

<Description of Quantization Processing>

Quantization processing in this embodiment will be described.

Figure 3:
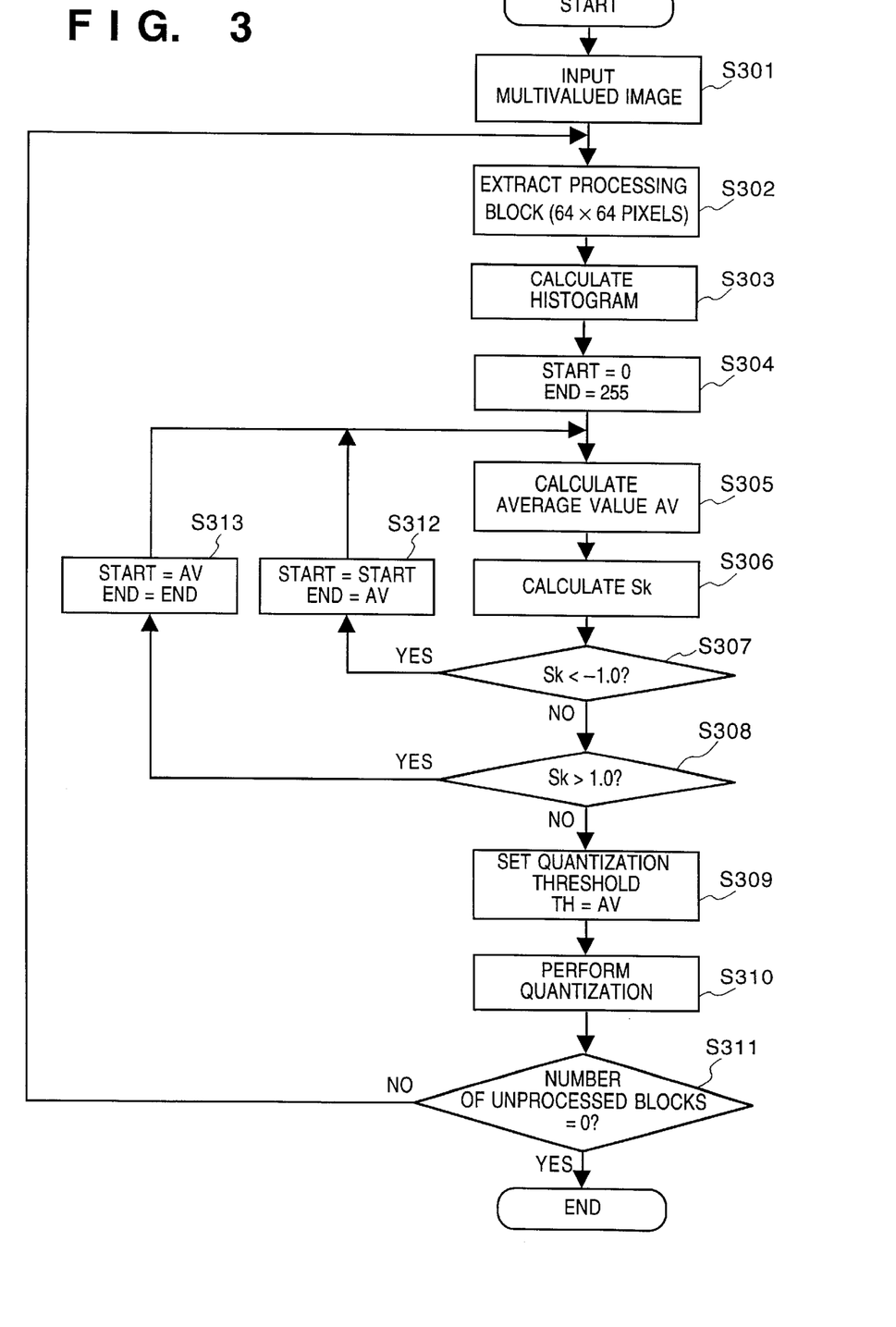
FIG. 3 is a flow chart showing binarization processing in this embodiment.
Figure 6:
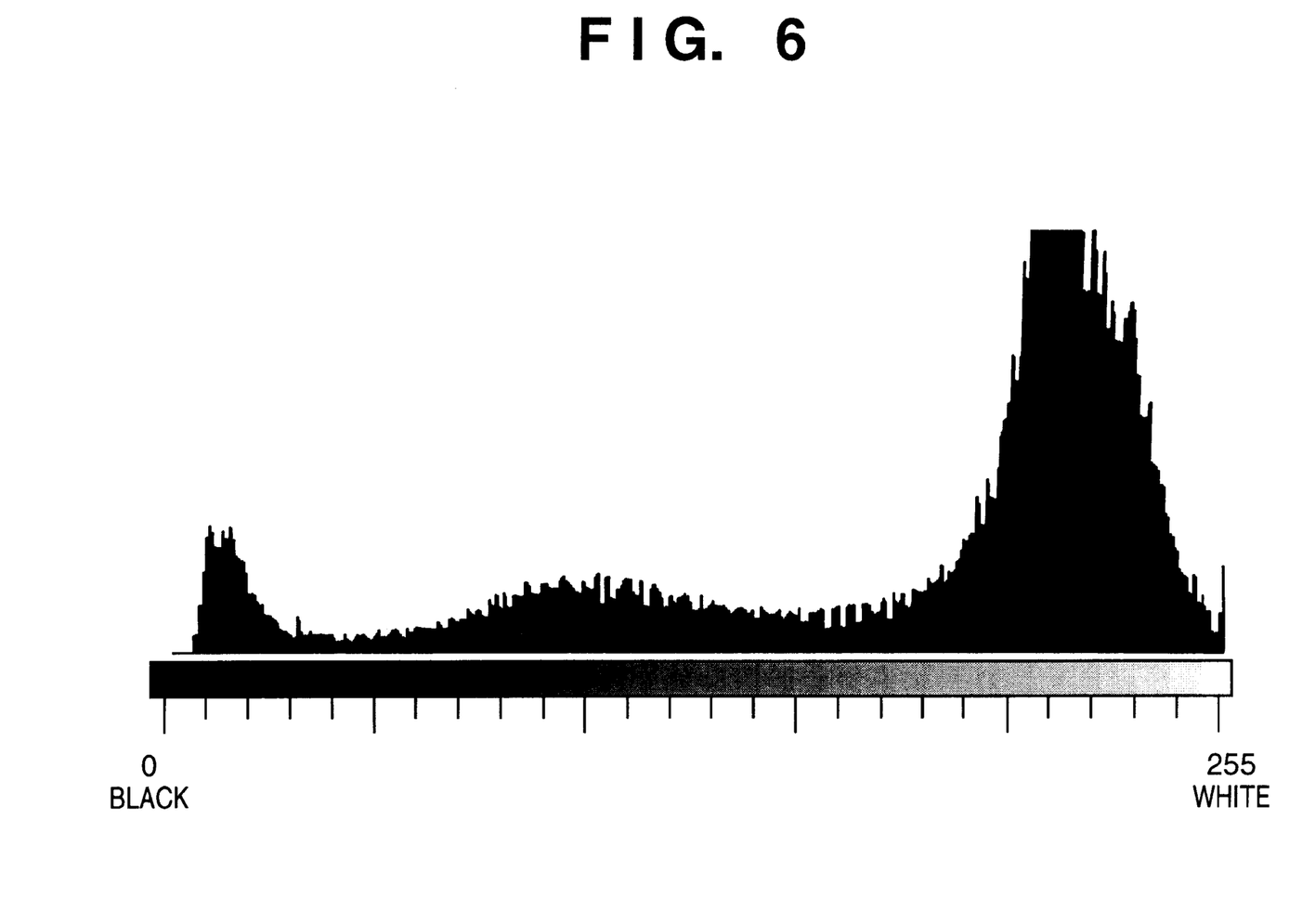
FIG. 6 is a graph showing an example of the histogram of an image in this embodiment.

FIG. 3 is a flow chart showing the procedure of quantization processing in this embodiment. Referring to FIG. 3, in step S301, an 8-bit multivalued image is input from the memory unit 102 in the image processing apparatus 1 to a memory (not shown) or the like. In step S302, the multivalued image is extracted in units of processing blocks (64×64 pixels). Note that the multivalued image is read by the image input device 2 such as a scanner, and stored in the memory unit 102 in advance. In step S303, the luminance frequency accumulation unit 103 calculates the histogram of each processing block. In this case, the frequencies of eight bits, i.e., digital values "0" to "255" are calculated using all the pixels of the processing block. As a result, a histogram like the one shown in FIG. 6 is obtained.

In step S304, parameters START and END are respectively set to "0" and "255". The parameters START and END respectively correspond to the start and end points of the statistic of a luminance value to be calculated in the subsequent steps S305 and S306.

In step S305, an average value AV of pixels corresponding to digital values START to END is calculated. For example, if START=0 and END=255, the average value AV of pixels having values "0" to "255" (all pixels in this case) is calculated. If START=0 and END=177, the average value AV of pixels having values "0" to "177" is calculated.

In step S306, a skew value Sk of pixels corresponding to luminance values START to END is calculated. The skew value is a statistic indicating the skew of the histogram distribution. The skew value is calculated using equation (1):

$$Sk = (\Sigma(Xi - AV)^3)/D \quad (1)$$

where "^" means the power, and Xi is the luminance value of the pixel. D is the variance value of the whole image, and calculated by equation (2):

$$D = \Sigma(Xi - AV)^2 \quad (2)$$

In equation (1), the skew value is calculated by cubing the difference between the luminance value of each pixel and the average value. The power is not limited to the third power as far as it is the odd-numbered power.

In steps S307 and S308, the skew direction of the histogram is determined. In step S307, the skew direction of the histogram is determined by inequality (3) given below. In this case, whether the skew of the histogram falls within the range of values smaller than the average value AV is determined.

$$Sk < -1.0 \quad (3)$$

If inequality (3) is "true" for the calculated skew value in step S307, the flow advances to step S312; if inequality (3) is "false", the flow shifts to step S308. In step S312, the average value AV is set in END without changing START. The flow returns to step S305 to calculate the average value AV of the values START to END again.

In step S308, the skew direction of the histogram is determined by inequality (4) given below. In this case, whether the skew of the histogram falls within the range of values larger than the average value AV is determined.

$$Sk > 1.0 \quad (4)$$

If inequality (4) is "true" for the calculated skew value in step S308, the processing shifts to step S313; if inequality (4) is "false", the processing advances to step S309. In step S313, the average value AV is set in START without changing END. The flow returns to step S305 to calculate the average value AV of the values START to END again.

In step S309, the average value AV obtained when both the conditions in steps S307 and S308 are "false" is set as a quantization threshold TH. In step S310, quantization processing using the quantization threshold TH is performed.

In step S311, whether the current processing block is the last (64 pixels×64 pixels) of the input image is checked. If YES in step S311, the processing ends; otherwise, the flow returns to step S302.

Figure 4:
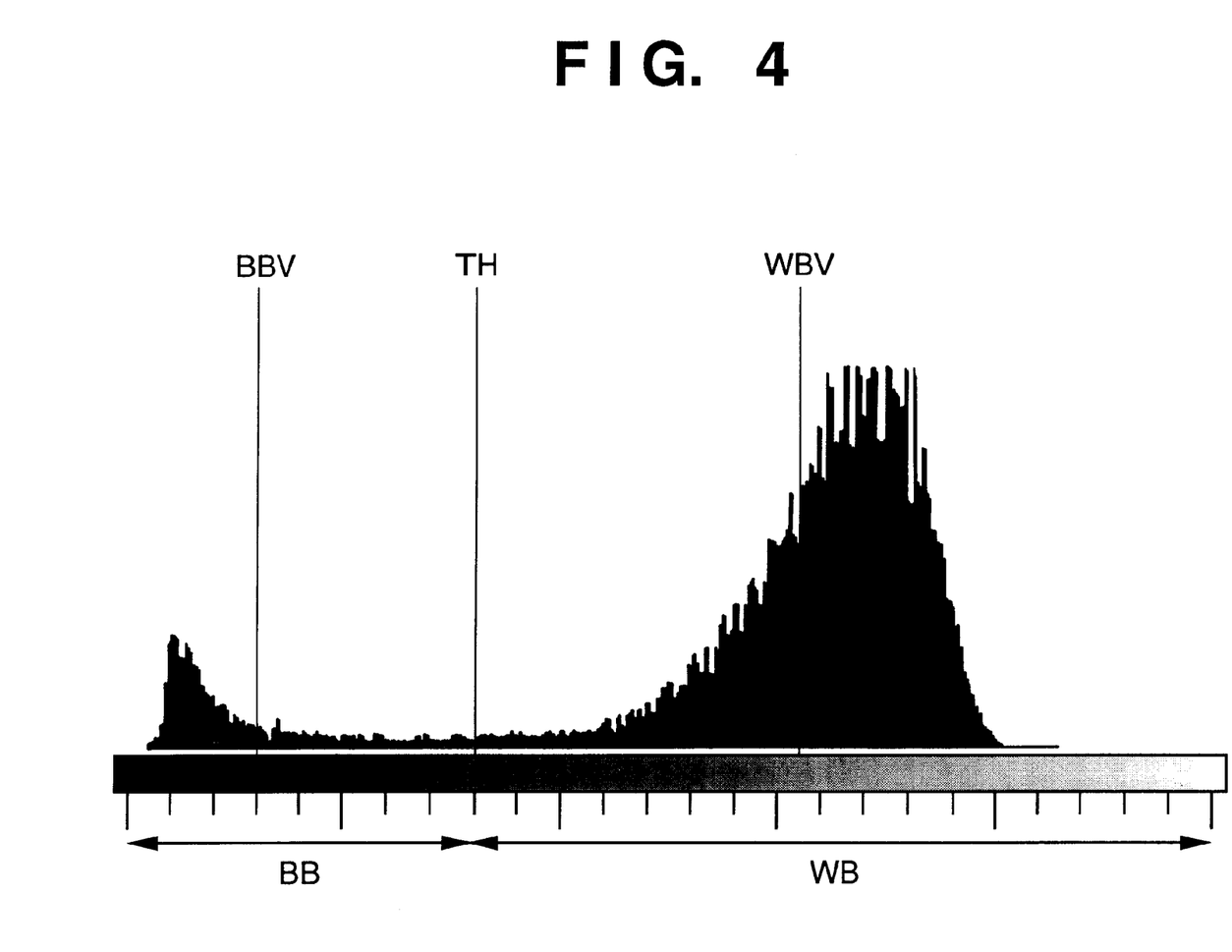
FIG. 4 is a graph for explaining quantization processing in step S309 shown in FIG. 3.

The manner of quantization will be explained with reference to FIG. 4.

In the histogram calculated in step S303, a region smaller than the quantization threshold TH calculated in step S309 is assumed to be BB, and a region larger than TH is WB. Normally, the representative values of the regions BB and WB are respectively set to 0 and 1 to perform binarization. In this case, however, gray information is lost.

In this embodiment, an average value BBV of the region BB and an average value WBV of the region WB are calculated, and an image is quantized using the two average values BBV and WBV.

Figure 5:
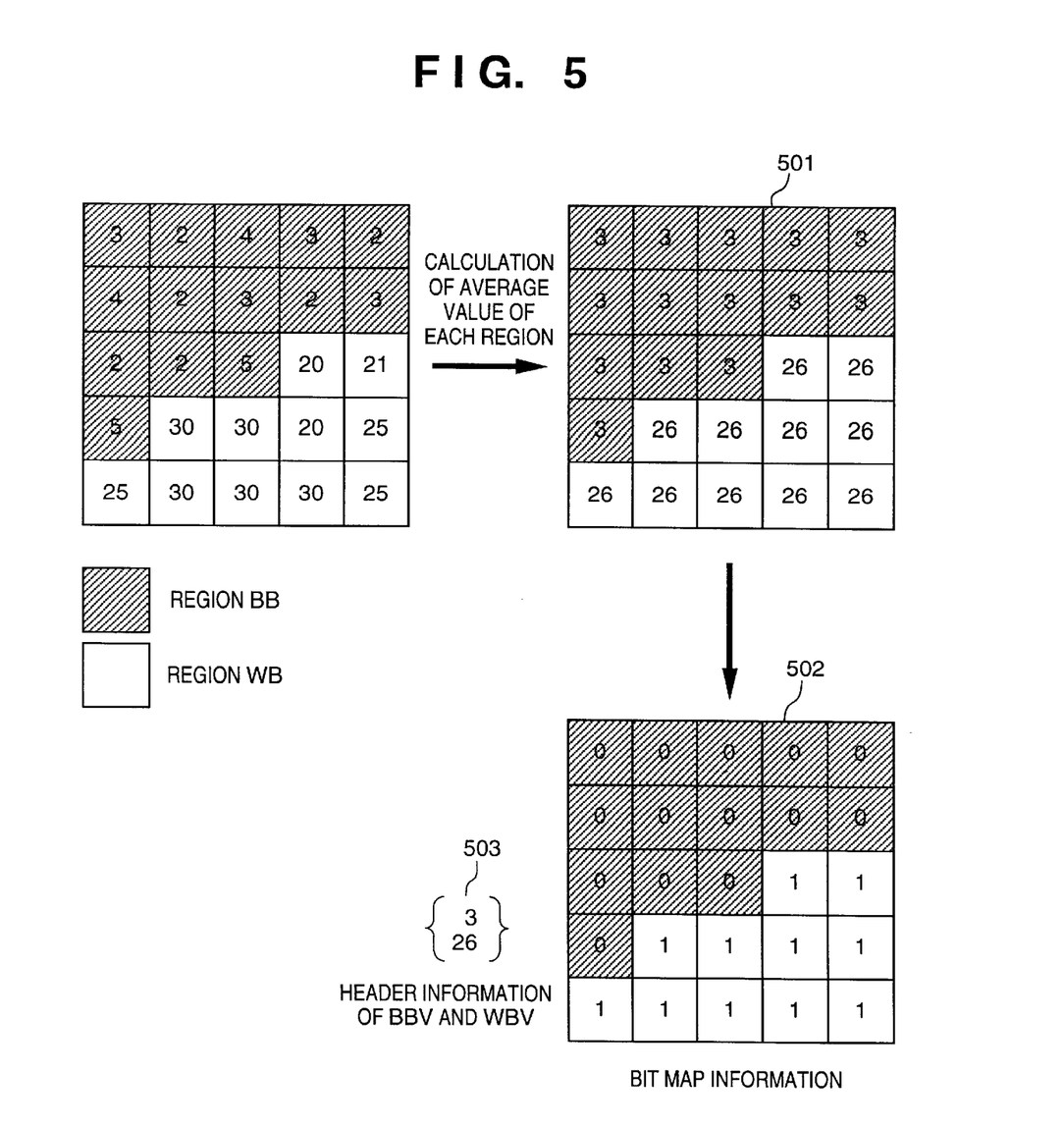
FIG. 5 is a view for explaining the quantization result.

As a result, the multivalued information of the image region is expressed by only two types of multivalued information, as shown in 501 of FIG. 5. As shown in 502 of FIG. 5, in the quantized data, header information 503 of BBV and WBV may be added to a bit map obtained by replacing the regions represented by BBV with 0, and the regions represented by WBV with 1. BBV and WBV are not limited to the average values, and may be the median values of the regions BB and WB.

Quantization processing in this embodiment is performed in the above-described manner. However, the range defined by inequalities (3) and (4) is not limited to this.

Quantization processing according to this embodiment will be explained in more detail below with reference to a detailed example of an image. Processing of determining the quantization threshold TH in this embodiment will be described with reference to an example of the histogram shown in FIG. 6.

FIG. 6 shows the histogram of a given image (8-bit input). In FIG. 6, the abscissa indicates the digital value of the luminance having "0" (black) at the left end and "255" (white) at the right end, and the ordinate indicates the frequency of each digital value.

Figure 7:
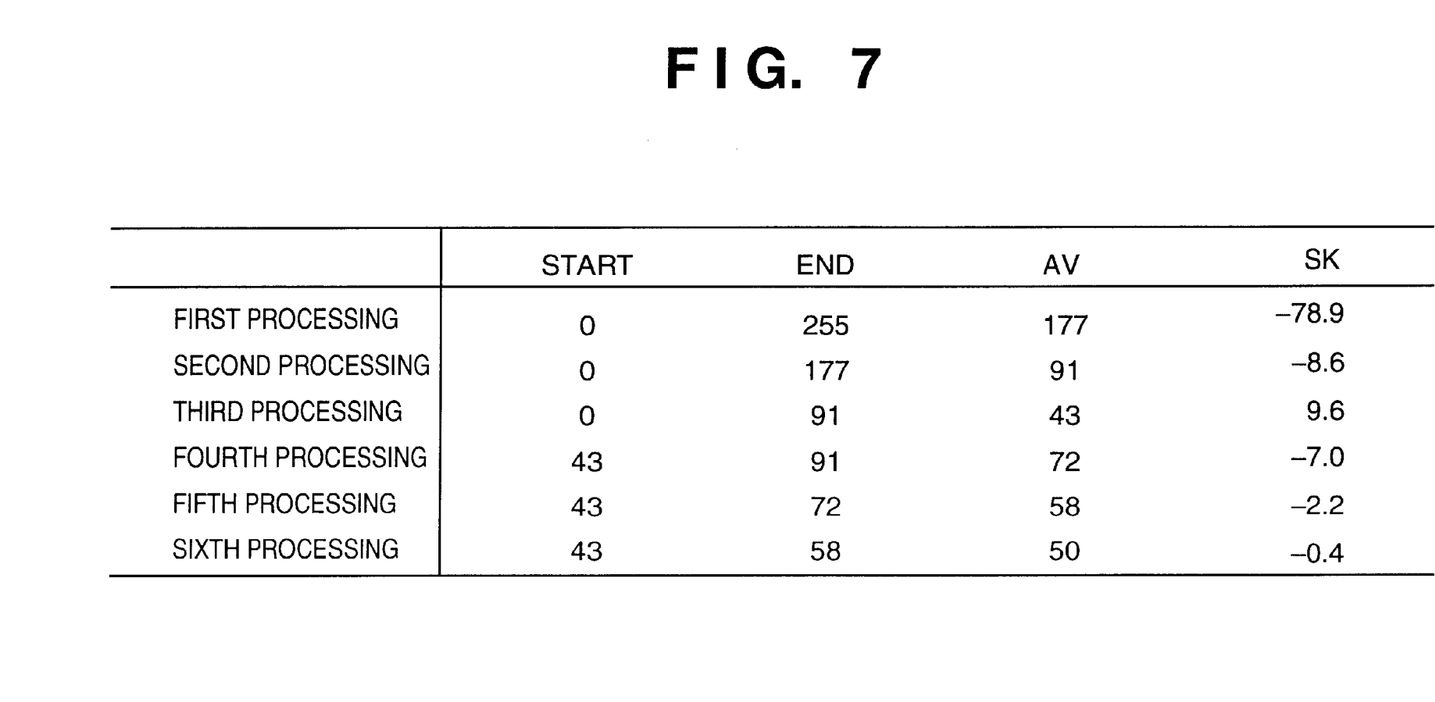
FIG. 7 is a table showing a conversion example of each parameter value of binarization processing in this embodiment.

FIG. 7 is a table showing changes in parameter value upon processes of steps S305 and S306 in quantization processing shown in FIG. 3 for an image having a histogram like the one shown in FIG. 6. Each parameter value in FIG. 7 is obtained each time the flow passes through steps S305 and S306 in FIG. 3.

In the first processing through steps S305 and S306, the average value AV and the skew value Sk are calculated for START=0 and END=225 to obtain "177" and "−78.9", respectively. In this case, since the skew value Sk is smaller than "−1.0", START=0 and END=177 are set in step S312 of FIG. 3. In the second processing, the average value AV and the skew value Sk are calculated for START=0 and END=177 to obtain "91" and "−8.6", respectively. Also in this case, since the skew value Sk is smaller than "−1.0", START=0 and END=91 are set in step S312 of FIG. 3.

In the third processing, the average value AV and the skew value Sk are calculated for START=0 and END=91 to obtain "43" and "9.6", respectively. In this case, since the skew value Sk exceeds "1.0", START=43 and END=91 are set in step S313 of FIG. 3.

In the fourth processing, the average value AV and the skew value Sk are calculated for START=43 and END=91 to obtain "72" and "−7.0", respectively. As for these values, since the skew value Sk is smaller than "−1.0", START=43 and END=72 are set in step S312 of FIG. 3.

In the fifth processing, the average value AV and the skew value Sk are calculated for START=43 and END=72 to obtain "58" and "−2.2", respectively. Since the skew value Sk is also smaller than "−1.0", START=43 and END=58 are set in step S312 of FIG. 3. In the sixth processing, the average value AV and the skew value Sk are calculated for START=43 and END=58 to obtain "50" and "−0.4", respectively.

In the sixth processing, the skew value Sk becomes "−1.0" or larger and "1.0" or smaller, and does not satisfy the conditions in steps S307 and S308 of FIG. 3 (NO in steps S307 and S308). The processing advances to step S309 to set "50" as the quantization threshold TH. In step S310, quantization processing using the quantization threshold TH is performed, and the quantized image is stored in the memory unit 102 of the image processing apparatus 1.

This quantization is performed using the average value of a region frequency smaller than the quantization threshold TH as representative value "1", and the average value of a region frequency larger than the quantization threshold TH as representative value "2". An image is quantized by the two values. Note that the representative values are not limited to them so long as they represent the features of a region frequency smaller than the quantization threshold TH and a region frequency larger than the quantization threshold TH. For example, the median value may be employed instead of the average value.

<Description of Image Region Separation Processing>

Image region separation processing (step S203 in FIG. 2) using the quantization result will be described in detail below with reference to a flow chart shown in FIG. 8.

Figure 8:
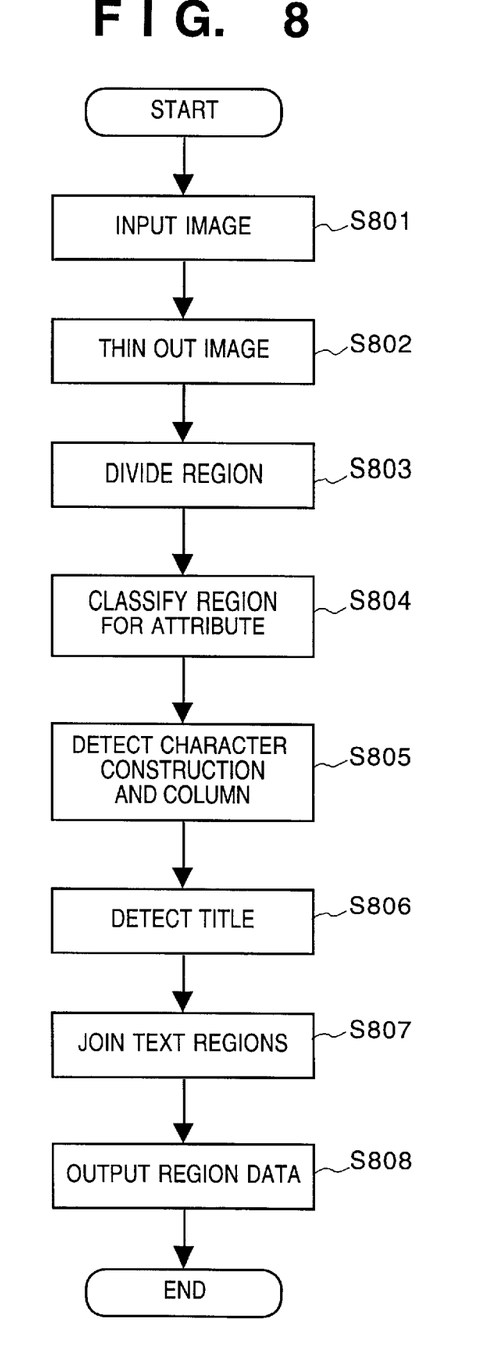
FIG. 8 is a flow chart showing image region separation processing in this embodiment.

In step S801 of FIG. 8, a quantized image is input and stored in the memory unit 102. In step S802, the input image is thinned out to decrease m×n pixels to one pixel, generating an image region separation image. At this time, if only one black pixel exists in the m×n pixels, this pixel is used as one black pixel. In step S803, a region having a predetermined number of black pixels successive in the vertical, horizontal, or oblique direction is defined as one region, and all the pixels of the image region separation image are divided into regions. At this time, the respective regions are labeled by numbering the regions in the detection order.

In step S804, the regions are classified depending on the width and height of each region and the number of black pixels in the region, and labeled with attributes. The attributes of the region include, e.g., "table", "outer frame region", and "text". In step S805, the widths and heights of all regions labeled "text" are averaged. If the obtained average width is larger than the average height, the processing image is regarded to be a horizontal writing; otherwise, the processing image is regarded as a vertical writing, thereby determining a character construction. At the same time, the character size of one character is determined by the average height for the horizontal writing or the average width for the vertical writing.

From the histogram of all the regions "text" in the vertical direction (for the horizontal writing) or the horizontal direction (for the vertical writing) on the image region separation image, the columns and line spacing of the writing are detected. In step S806, of the regions "text", one having a large character size is determined as a "title". In the conventional region determination for a binarized image, even if a band indicating title emphasis exists on the background of the region determined as a title, the existence of the band cannot be recognized because the background information is lost. For the same reason, even if title characters themselves are colored, they are determined as only "black characters". The band is inserted in the background of the title or the title characters are colored because the document producer wants to discriminate the title from another title. In the conventional method, however, all the titles are determined as equal "titles".

The greatest advantage of the use of a quantized image as a region separation image is to solve this problem. For example, when the title of an original image is expressed using gray characters 200 in 8-bit expression as the title character and a gray band 64 as the background, as shown in 901 of FIG. 9, a conventional image is binarized like the one shown in 902 of FIG. 9 regardless of the presence of the title character color and the background color. Accordingly, the character color and background color information are lost upon binarization.

Figure 9:
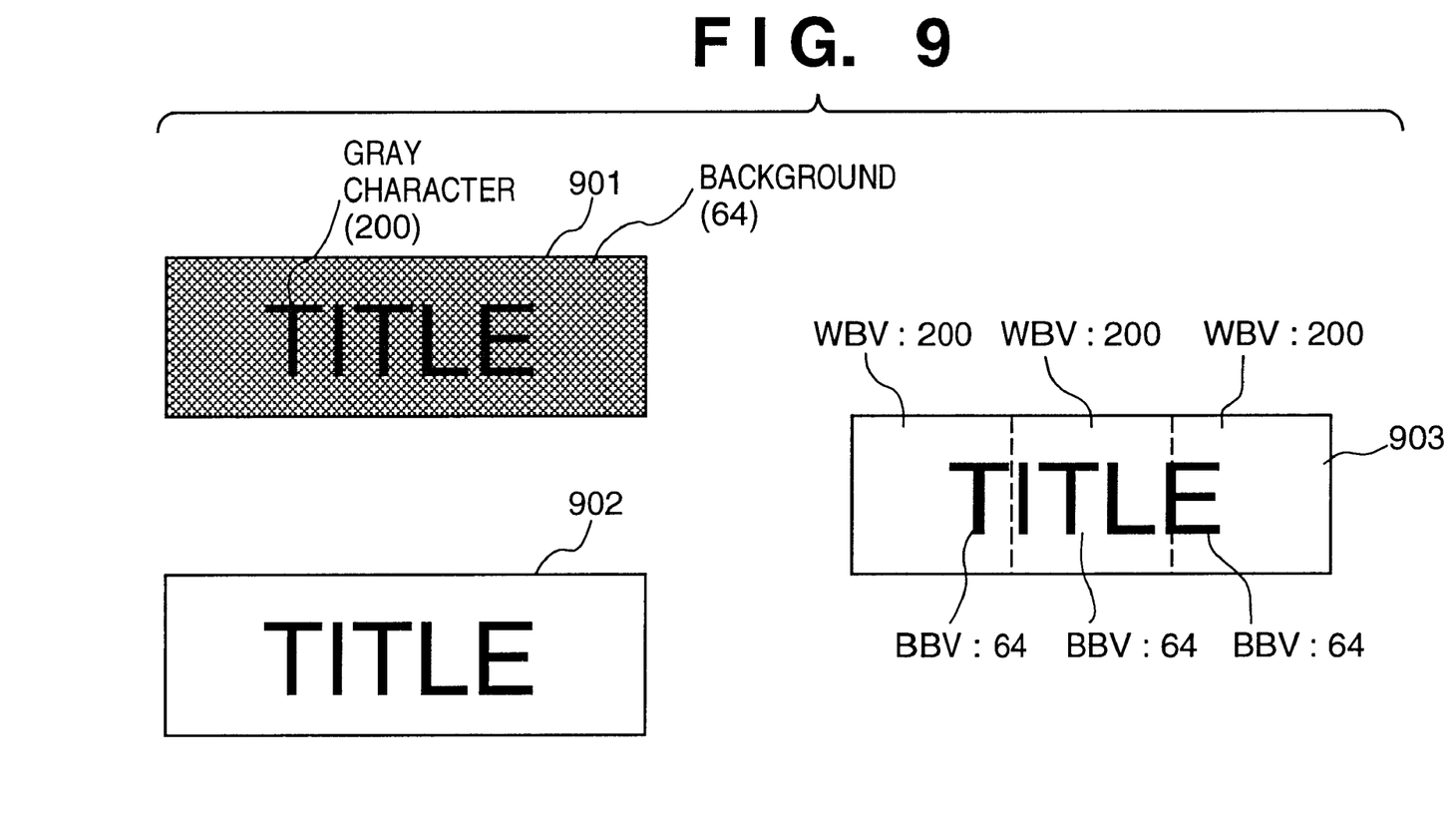
FIG. 9 is a view for explaining an emphasized title in this embodiment.

In quantization of this embodiment, the average value of a region at the left block having a block unit of 64×64 pixels that is smaller than the calculated quantization threshold TH, in this case, the average pixel value BBV of the character region "T" of the character "TITLE" is calculated to be 64. In this block, the average value of a region larger than the quantization threshold TH, in this case, the average value WBV of the region corresponding to the background color is calculated to be 200. BBV and WBV are added in block units of 64×64 pixels in addition to a normal binarized image. Therefore, the title character color and the background color can be discriminated.

Figure 10:
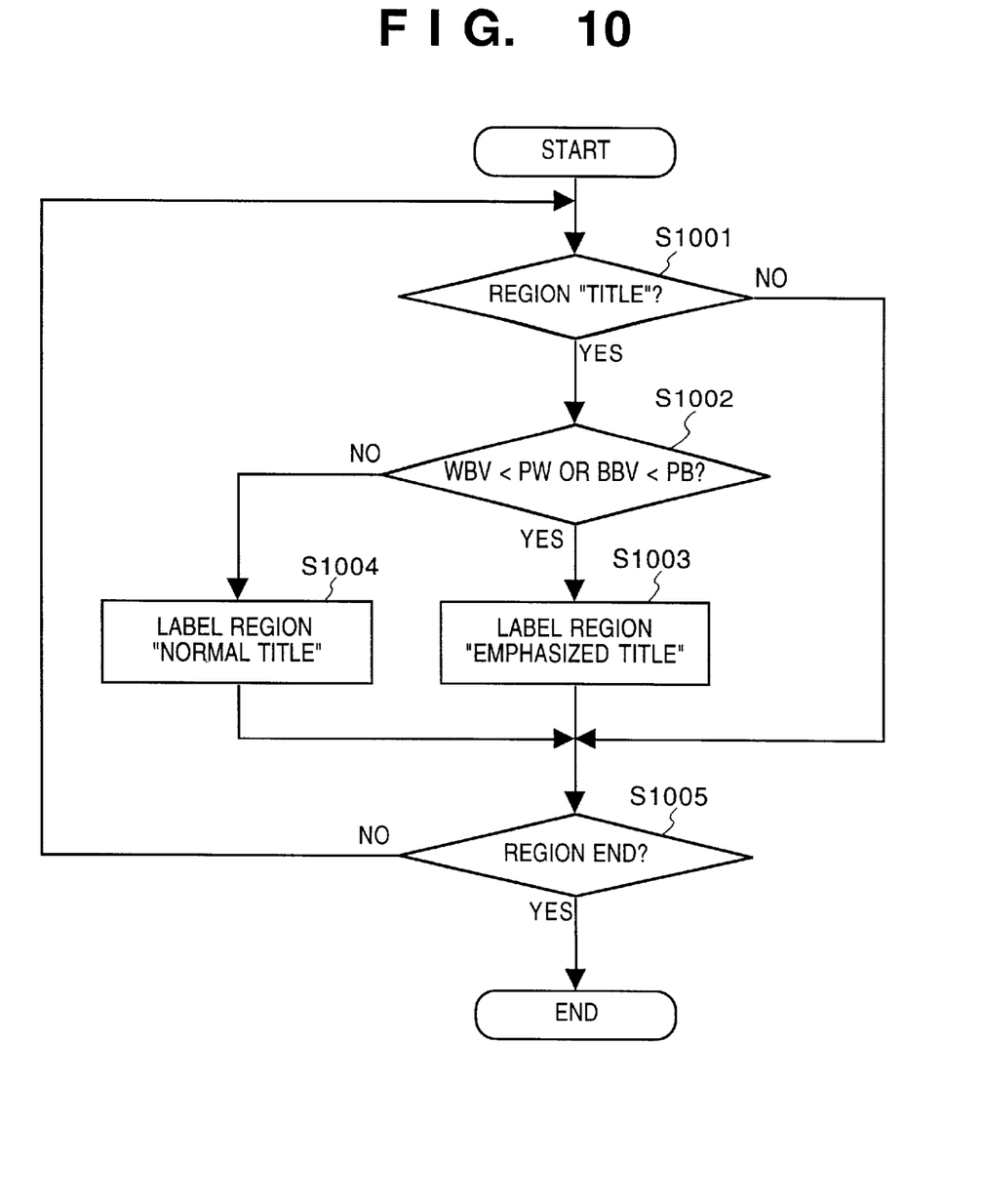
FIG. 10 is a flow chart showing title determination processing in this embodiment.

In this embodiment, processing shown in FIG. 10 is performed for a region determined as a title. In step S1001, region determination is performed using only image information quantized in the above manner. Processing in step S1002 is executed for the region determined as "title". In FIG. 10, reference symbols WBV, BBV, PW, and PB are as follows.

WBV: the average value of a region larger than the quantization threshold TH calculated in units of blocks BBV: the average value of a region smaller than the quantization threshold TH calculated in units of blocks PW: the representative value of the background region of an original image PB: the representative value of the character region of the original image In quantization, WBV and BBV are added in block units of 64×64 pixels in addition to binarization information. PW is the representative value of the background of the original image, and means the white density of a paper sheet upon reading an image by a scanner. Since PW slightly varies depending on the difference between scanner devices or the type of paper sheet, PW is set based on several types of samples in advance. PB is the representative value of the character region of the original image, and means the density of a character printed on the paper sheet upon reading the image by the scanner. Since PB also slightly varies depending on the difference between scanner devices or the type of paper sheet, similar to PW, PB is set based on several types of samples in advance.

WBV and PW are compared with each other. When WBV is smaller than PW, the background color of this block is estimated to have a background color darker than the background on the paper sheet. Then, BBV and PB are compared with each other. When BBV is larger than PB, the density of a character printed in this block is estimated to be that of a colored character lower than that of a normal black character. Therefore, when WBV is smaller than PW, or BBV is larger than PB, the title in this region is determined to have a background color or character color emphasizing the title, and the flow branches to step S1003. Otherwise, the flow shifts to step S1004. In step S1003, the region is labeled "emphasized title". In step S1004, a region is labeled "normal title".

In step S807, regions "title" and "text" present independently of each other are joined to one region in accordance with the interval between the regions "title" and "text" and surrounding regions.

In step S808, region data such as the attribute, the coordinate and size on the original image, and the like is output for each region. By performing the above processing, image region separation processing for the quantized image can be performed to obtain region data.

Figure 11:
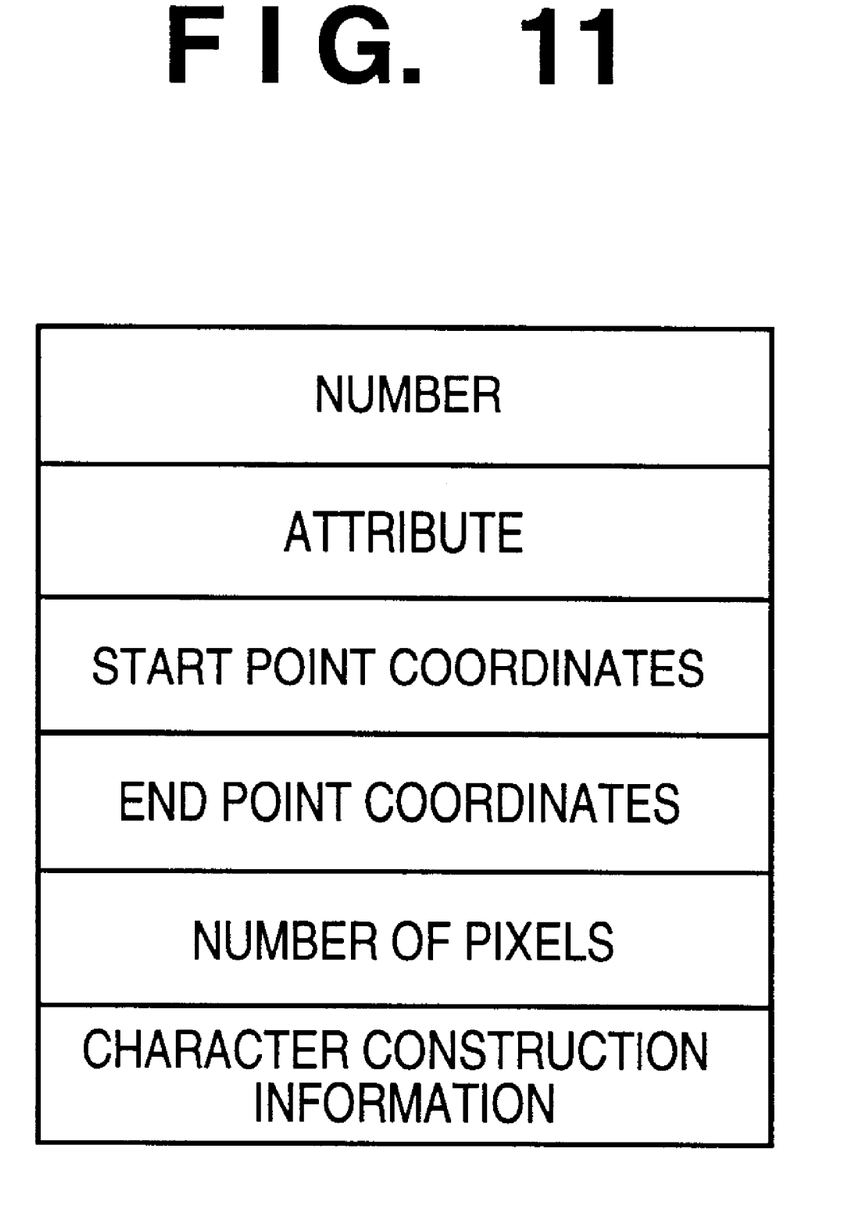
FIG. 11 is a table showing an example of region data in this embodiment.

FIG. 11 is a table showing an example of the region data described above. The region data items shown in FIG. 11 will be explained below.

"Number": the detection order of regions

"Attribute": attribute information of a region; the following nine types of attributes are prepared;

"Route" indicates an input image itself.

"Text" indicates a character.

"Emphasized title" indicates an emphasized title region.

"Normal title" indicates a normal title region.

"Table" indicates a table region.

"Noise region" indicates that a region cannot be determined as either character or image.

"Outer frame region" indicates a ruled line or the like.

"Photographic image" indicates a photography region.

"Line image" indicates a line image region.

"Start point coordinates":

the coordinates (X, Y) of the start point of the region on the original image.

"End point coordinates":

the coordinates (X, Y) of the end point of the region on the original image.

"Number of pixels":

the number of all pixels in the region

"Character construction information":

three types of character construction information "vertical writing", "horizontal writing", and "unknown"

As for the region data shown in FIG. 11, only a region having "attribute" of "text" hierarchically holds region data about lines (line region data) before joining in step S807 of FIG. 8.

Image region separation processing is performed in the above-described way. However, the region data shown in FIG. 11 is only an example according to this embodiment. In accordance with the image processing apparatus, for example, another information may be properly added, or the region data may be decreased.

As has been described above, according to this embodiment, the luminance frequency of an input multivalued image and a skew value representing the skew converge to predetermined values to determine the quantization threshold. Quantization is performed based on this quantization threshold. With this processing, after specifying a region having a threshold optimal for separating the background and the object within the image, the image can be quantized using the average luminance value of the specified region. As a result, an optimal value used in classifying the luminance values of pixels in a region on the input multi-valued image into two, background and object classes can be easily calculated. At the same time, high-resolution OCR processing can be executed.

In the above-described embodiment, an input image is 8-bit multivalued image data. However, the present invention is not limited to this, and the image information may only be information of a plurality of bits such as an color image for the purpose of quantization. Although the convergence condition of the skew value Sk serving as the statistic is set to ±1.0, the present invention is not limited to this. In other words, the image processing apparatus may only be constituted to determine the quantization threshold using the skew value Sk.

Note that the present invention may be applied to either a system constituted by a plurality of equipments (e.g., a host computer, an interface device, a reader, and a printer), or an apparatus consisting of a single equipment (e.g., a copying machine or a facsimile apparatus).

The objects of the present invention are also achieved by supplying a storage medium, which records a program code of a software program that can realize the functions of the above-mentioned embodiment to the system or apparatus, and reading out and executing the program code stored in the storage medium by a computer (or a CPU or MPU) of the system or apparatus. In this case, the program code itself read out from the storage medium realizes the functions of the above-mentioned embodiment, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the readout program code by the computer but also by some or all of actual processing operations executed by an OS (operating system) running on the computer on the basis of an instruction of the program code.

Furthermore, the functions of the above-mentioned embodiment may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the above embodiment, if a region having the minimum luminance frequency is specified on the basis of the luminance frequency of an input multivalued image and the skew of its distribution, and the image is quantized using the average luminance value of the specified region as a quantization threshold, a proper threshold can be set between the object density and background density within the image to obtain an image while suppressing generation of the block skew.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for quantizing a multivalued image to perform image processing, comprising:
    forming means for calculating a luminance frequency of the multivalued image to form a histogram;
    specifying means for specifying a quantization threshold for quantization on the basis of the formed histogram;
    representative value determination means for determining a first representative value from a region having a value smaller than the specified quantization threshold and a second representative value from a region having a value larger than the quantization threshold specified by said specifying means in the histogram;
    quantization means for quantizing the multivalued image;
    means for performing image region separation for the image quantized by said quantization means, and outputting region data including an attribute of a region obtained by the image region separation; and
    discriminating means for discriminating the attribute of each region of the separated image by using the quantized multivalued image data, wherein the first representative value is used as information representing character data, and the second representative value is used as information representing background data of the character in the discrimination,
    wherein said quantization means generates binary data on the basis of the specified quantization threshold, and obtains the binary data and header information of the first and second representative values as quantization results.

2. The apparatus according to claim 1, wherein the quantization threshold is an average luminance value obtained when a histogram distribution converges to make a skew of the histogram distribution of the luminance frequency fall within a predetermined range.

3. The apparatus according to claim 1, wherein the first and second representative values are an average luminance value in each distribution region of a histogram distribution of the luminance frequency that is divided by the quantization threshold.

4. The apparatus according to claim 1, wherein the first and second representative values are a median luminance value in each distribution region of a histogram distribution of the luminance frequency that is divided by the quantization threshold.

5. The apparatus according to claim 1, further comprising means for, when the attribute of the region is a title, determining whether the title is an emphasized title.

6. An image processing method of quantizing a multivalued image to perform image processing, comprising the steps of:
    calculating a luminance frequency of the multivalued image to form a histogram;
    specifying a quantization threshold for quantization on the basis of the formed histogram;
    determining a first representative value from a region having a value smaller than the specified quantization threshold and a second representative value from a region having a value larger than the quantization threshold specified by said specifying means in the histogram;
    quantizing the multivalued image;
    performing image region separation for the image quantized in the quantization step, and outputting region data including an attribute of a region obtained by the image region separation; and
    discriminating the attribute of each region in the separated image by using the quantized multivalued image data, wherein the first representative value is used as information representing character data, and the second representative value is used as information representing background data of the character in the discrimination,
    wherein, in said quantizing step, binary data generated on the basis of the specified quantization threshold and header information of the first and second representative values are obtained as quantization results.

7. The method according to claim 6, wherein the quantization threshold is an average luminance value obtained when a histogram distribution converges to make a skew of the histogram distribution of the luminance frequency fall within a predetermined range.

8. The method according to claim 6, wherein the first and second representative values are an average luminance value in each distribution region of a histogram distribution of the luminance frequency that is divided by the quantization threshold.

9. The method according to claim 6, wherein the first and second representative values are a median luminance value in each distribution region of a histogram distribution of the luminance frequency that is divided by the quantization threshold.

10. The method according to claim 6, further comprising the step of, when the attribute of the region is a title, determining whether the title is an emphasized title.

11. A computer readable storage medium storing a program code of an image processing method, comprising:

a code of the step of calculating a luminance frequency of the multivalued image to form a histogram;

a code of the step of specifying a quantization threshold for quantization on the basis of the formed histogram;

a code of the step of determining a first representative value from a region having a value smaller than the specified quantization threshold and a second representative value from a region having a value larger than the quantization threshold specified by said specifying means in the histogram;

a code of the step of quantizing the multivalued image;

a code of the step of performing image region separation for the image quantized in the quantization step, and outputting region data including an attribute of a region obtained by the image region separation; and a code of the step of discriminating the attribute of each region in the separated image by using the quantized multivalued image data, wherein the first representative value is used as information representing character data, and the second representative value is used as information representing background data of the character in the discrimination, wherein, by said code of the step of quantizing, binary data generated on the basis of the specified quantization threshold and header information of the first and second representative values are obtained as quantization results.

* * * * *